US010887607B2

(12) United States Patent
Watters et al.

(10) Patent No.: US 10,887,607 B2
(45) Date of Patent: Jan. 5, 2021

(54) MAKING OBJECT-LEVEL PREDICTIONS OF THE FUTURE STATE OF A PHYSICAL SYSTEM

(71) Applicant: DeepMind Technologies Limited, London (GB)

(72) Inventors: Nicholas Watters, London (GB); Razvan Pascanu, Letchworth Garden City (GB); Peter William Battaglia, London (GB); Daniel Zorn, London (GB); Theophane Guillaume Weber, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/686,718

(22) Filed: Nov. 18, 2019

(65) Prior Publication Data

US 2020/0092565 A1 Mar. 19, 2020

Related U.S. Application Data

(63) Continuation of application No. PCT/EP2018/063304, filed on May 22, 2018.
(Continued)

(51) Int. Cl.
*H04N 19/174* (2014.01)
*H04N 19/105* (2014.01)
(Continued)

(52) U.S. Cl.
CPC ......... *H04N 19/174* (2014.11); *H04N 19/105* (2014.11); *H04N 19/139* (2014.11);
(Continued)

(58) Field of Classification Search
CPC .. H04N 19/174; H04N 19/105; H04N 19/139; H04N 19/46; H04N 19/52; H04N 19/61; H04N 19/577
See application file for complete search history.

(56) References Cited

U.S. PATENT DOCUMENTS

| 5,210,798 A * | 5/1993 | Ekchian | G01S 7/417 |
| | | | 382/103 |
| 8,457,469 B2 * | 6/2013 | Suzuki | G06K 9/00711 |
| | | | 386/239 |

(Continued)

OTHER PUBLICATIONS

PCT International Preliminary Report on Patentability in International Appln. No. PCT/EP2018/063304, dated Nov. 19, 2019, 13 pages.

(Continued)

*Primary Examiner* — James M Pontius
(74) *Attorney, Agent, or Firm* — Fish & Richardson P.C.

(57) ABSTRACT

A system implemented by one or more computers comprises a visual encoder component configured to receive as input data representing a sequence of image frames, in particular representing objects in a scene of the sequence, and to output a sequence of corresponding state codes, each state code comprising vectors, one for each of the objects. Each vector represents a respective position and velocity of its corresponding object. The system also comprises a dynamic predictor component configured to take as input a sequence of state codes, for example from the visual encoder, and predict a state code for a next unobserved frame. The system further comprises a state decoder component configured to convert the predicted state code, to a state, the state comprising a respective position and velocity vector for each object in the scene. This state may represent a predicted position and velocity vector for each of the objects.

20 Claims, 3 Drawing Sheets

Related U.S. Application Data

(60) Provisional application No. 62/509,049, filed on May 19, 2017.

(51) Int. Cl.
  *H04N 19/139* (2014.01)
  *H04N 19/46* (2014.01)
  *H04N 19/52* (2014.01)
  *H04N 19/577* (2014.01)
  *H04N 19/61* (2014.01)

(52) U.S. Cl.
  CPC ............ *H04N 19/46* (2014.11); *H04N 19/52* (2014.11); *H04N 19/577* (2014.11); *H04N 19/61* (2014.11)

(56) References Cited

U.S. PATENT DOCUMENTS

| | | | | |
|---|---|---|---|---|
| 9,773,185 | B2* | 9/2017 | Kanda | G06K 9/00751 |
| 10,341,599 | B2* | 7/2019 | Milton | H04N 5/44591 |
| 10,387,752 | B1* | 8/2019 | Kim | G06K 9/6257 |
| 10,387,754 | B1* | 8/2019 | Kim | G06K 9/6261 |
| 10,402,695 | B1* | 9/2019 | Kim | G06K 9/6268 |
| 10,423,860 | B1* | 9/2019 | Kim | G06K 9/6262 |
| 10,430,691 | B1* | 10/2019 | Kim | G06K 9/3233 |
| 10,621,378 | B1* | 4/2020 | Kim | G06F 21/6254 |
| 2008/0059036 | A1* | 3/2008 | Imai | B60W 30/143 701/93 |
| 2012/0033933 | A1* | 2/2012 | Suzuki | G06K 9/00711 386/230 |
| 2015/0130951 | A1* | 5/2015 | Olson | G06T 7/80 348/184 |
| 2016/0219281 | A1* | 7/2016 | Yoshikawa | H04N 19/167 |
| 2016/0330466 | A1* | 11/2016 | Moriyoshi | H04N 19/436 |
| 2017/0334066 | A1* | 11/2017 | Levine | B25J 9/161 |
| 2019/0050694 | A1* | 2/2019 | Fukagai | G06K 9/00664 |
| 2019/0050994 | A1* | 2/2019 | Fukagai | G06K 9/3233 |
| 2019/0178654 | A1* | 6/2019 | Hare | G06F 16/29 |
| 2019/0238952 | A1* | 8/2019 | Boskovich | H04N 21/23418 |
| 2019/0294881 | A1* | 9/2019 | Polak | G06N 3/08 |
| 2019/0318171 | A1* | 10/2019 | Wang | G06K 9/00771 |

OTHER PUBLICATIONS

Battaglia et al, "Interaction networks for learning about objects, relations and physics," arXiv, Dec. 1, 2016, 12 pages.

Chang et al, "Compositional object-based approach to learning physical dynamics," arXiv, Mar. 4, 2017, 15 pages.

Ehrhardt et al, "Learning a physical long-term predictors," arXiv, Mar. 1, 2017, 10 pages.

Fragkiadaki et al, "Learning visual predictive models of physical for playing billiards," arXiv, Jan. 19, 2016, 12 pages.

PCT International Search Repoirt and Written Opinion in International Appln. No. PCT/EP2018/063304, dated Aug. 31, 2018, 19 pages.

Vylomova et al, "Word representation models for morphologically rich languages in neural machine translation," arXiv, Jun. 14, 2016, 9 pages.

Watters et al, "Visual interaction networks," arXiv, dated Jun. 5, 2017, 14 pages.

Bandanau et al, "Neural machine translation by jointly to align and translate," arXiv, Oct. 7, 2014, 15 pages.

Yu et al, "Online segment to segment neural transduction," arXiv, Sep. 26, 2016, 10 pages.

Raffel et al, "Training a subsampling mechanism in expectation," arXiv, Feb. 22, 2017, 4 pages.

Agrawal et al., "Learning to poke by poking: Experiential learning of intuitive physics" arXiv, 2019, 10 pages.

Battaglia et al., "Simulation as an engine of physical scene understanding" Proceedings of the National Academy of Sciences, 110(45): 18327-18332, 2013, 6 pages.

Bhat et al., "Computing the physical parameters of rigid-body motion from video" Computer Vision—ECCV 2002, pp. 551-565, 2002, 15 pages.

Bhattacharyya et al., "Long-term image boundary extrapolation" arXiv, 2016, 11 pages.

Brubaker et al., "Estimating contact dynamics" Computer Vision, 2009 IEEE 12th International Conference, pp. 2389-2396, 2009, 8 pages.

Chang et al., "A compositional object-based approach to learning physical dynamics" arXiv, 2016, 15 pages.

Gerstenberg et al., "Noisy newtons: Unifying process and dependency accounts of causal attribution" In proceedings of the 34th. Citeseer, 2012, 6 pages.

Gerstenberg et al., "From counterfactual simulation to causal judgment" CogSci, 2014, 6 pages.

Grzeszczuk et al., "Fast neural network emulation and control of physics-based models" Proceedings of the 25th annual conference on Computer graphics and interactive techniques, pp. 9-20, ACM, 1998, 112 pages.

Hamrick et al., "Inferring mass in complex scenes by mental simulation" Cognition, 154:61-76, 2016, 16 pages.

Ladicky et al., "Data-driven fluid simulations using regression forests" ACM Transactions on Graphics, 34(6):199, 2015, 9 pages.

LeCun et al., "Deep learning" Nature, 521(7553):436-444, 2015, 35 pages.

Lerer et al., "Learning Physical intuition of block towers by example" arXiv, 2016, 11 pages.

Li et al., "To fall or not to fall: A visual approach to physical stability prediction" arXiv, 2016, 20 pages.

Mottaghi et al., "Newtonian scene understanding. Unfolding the dynamics of object in static images"Proceedings of the IEEE Conference on Computer Vision and Pattern Recognition, pp. 3521-3529, 2016, 9 pages.

Mottaghi et al., ""what happens if . . . " learning to prodict the effect of forces in images" European Conference on Computer Vision, pp. 269-285, Springer, 2016, 17 pages.

Spelke et al., "Core knowledge" Developmental science, 10(1):89-96, 2007, 8 pages.

Stewart et al., "Label-free supervision of neural networks with physics and domain knowledge" arXiv, 2016, 7 pages.

Winston, "Learning structural descriptions from examples" 1970, 248 pages.

Wu et al., "Physics 101: Learning physical object properties from unlabeled vidion" Psychological Science, 13(3):89-94, 2016, 12 pages.

Wu et al., "Galileo: Perceiving physical object properties by integrating a physics engine with deep lerning" Advances in neurak information processing systems, pp. 127-135, 2015, 9 pages.

* cited by examiner

US 10,887,607 B2

MAKING OBJECT-LEVEL PREDICTIONS OF THE FUTURE STATE OF A PHYSICAL SYSTEM

CROSS-REFERENCE TO RELATED APPLICATIONS

This application is a continuation of, and claims the benefit of priority to, International Patent Application No. PCT/EP2018/063304, for "MAKING OBJECT-LEVEL PREDICTIONS OF THE FUTURE STATE OF A PHYSICAL SYSTEM," which was filed on May 22, 2018, and which claims the benefit under 35 U.S.C. § 119(e) of the filing date of U.S. Patent Application No. 62/509,049, for "MAKING OBJECT LEVEL PREDICTIONS OF THE FUTURE STATE OF A PHYSICAL SYSTEM," which was filed on May 19, 2017, and both of which are incorporated here by reference.

BACKGROUND

This specification relates to machine learning models that can be trained to predict future states of physical systems.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network (RNN) is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

Some neural networks are convolutional neural networks. A convolutional neural network is a feed-forward neural network that makes the assumption that the inputs are images. Generally, the images can be thought of as represented as volumes, namely, a matrix of pixel values for each of multiple channels. The channels are generally color channels. Convolutional neural network layers have computational neurons arranged in three dimensions corresponding to the dimensions of the input data. Three types of layers are used to build a convolutional neural network: one or more convolutional layers, one or more pooling layers, and one or more fully connected layers. Each of these layers generates an output volume of activations from an input volume of activations. A sequence of layers of a simple convolutional neural network can be, for example, an input layer holding pixel values of an image, followed by a convolutional layer computing outputs of neurons that are connected to local regions in the input, each computing a dot product between the weights of the neuron and a small region in the input volume. The resulting volume may be larger or smaller depending on the number of filters applied in the convolutional layer. This layer is followed in this example by a ReLU (rectified linear unit) layer that applies a nonlinear activation function, such as the max (0, input) to each element. This is followed in this example by a pooling layer that performs a down-sampling along the width and height of the volume, which is followed by a fully-connected layer that computes class scores. Each layer in the fully-connected layer receives all the values in generated in the pooling layer.

SUMMARY

This specification describes systems implementing visual interaction networks (VINs) that learn physics from videos and can encode both short- and long-term spatial interactions between objects. An example system combines an interaction network and a deep convolutional neural network. The system has a perceptual front-end based on convolutional neural networks and a dynamics predictor based on interaction networks. Through joint training, the perceptual front-end learns to parse a dynamic visual scene into a set of factored latent object representations. The dynamics predictor learns to roll the representations forward in time by computing their interactions and dynamics, producing a predicted physical trajectory of arbitrary length.

Thus in one implementation a system implemented by one or more computers comprises a visual encoder component configured, more particularly trained, to receive as input data representing a sequence of image frames, in particular representing objects in a scene of the sequence, and to output a sequence of corresponding state codes, each state code comprising vectors, one for each of the objects, wherein each vector represents a respective position and velocity of its corresponding object. The system also comprises a dynamic predictor component configured, more particularly trained, to take as input a sequence of state codes, for example from the visual encoder, and predict a "final", i.e. predicted, state code for a next unobserved frame. The system further comprises a state decoder component configured, more particularly trained, to convert a state code, in particular the "final" or predicted state code, to a state, the state comprising a respective position and velocity vector for each object in the scene. This state may represent a predicted position and velocity vector for each of the objects.

Each state code may comprise a list of entries or "slots" for the vectors representing the object positions and velocities. Each state may similarly comprise a list of entries or slots for position and velocity vectors for the objects.

In some implementations the system is configured to apply the visual encoder in a sliding window over a sequence of frames, to produce the sequence of state codes. Thus each state code may encode a sequence of image frames.

The dynamic predictor component is described further later but in general terms may comprise multiple interaction networks with different temporal offsets. Each interaction network is configured to take input at a different temporal offset and to produce a (predicted) candidate state code for its temporal offset. The dynamic predictor component is configured to aggregate the candidate state codes, for example using a multilayer perceptron, to produce a predicted state code for the next (unobserved) frame after the input sequence of image frames.

The temporal offset refers to a difference in time between the (predicted) candidate state code, i.e. a time of the next (unobserved) frame, and a time of the state code used to predict it. The time of the state code used to predict it may be defined by a time of one of the frames of the sequence of image frames encoded by the state code, for example a most recent image frame of the sequence. The temporal offsets may be 1, 2, and 4.

In some implementations for an input state code sequence, for each offset t a separate interaction network component computes a candidate predicted state code from the input state code at index t.

In some implementations an interaction network applies a relation network to the combination (concatenation) of each object's vector with each other (object) vector to update the object's vector. The interaction network may also apply a self-dynamics network to the object's vector itself, to provide an additional update to the object's vector; the updates may be added.

The dynamic predictor component may be configured as a recurrent neural network and trained to predict a state for each of a predetermined number of unseen frames.

There is also described a method comprising receiving data representing a sequence of image frames and generating from the image frames a sequence of corresponding state codes, each state code comprising a set of object codes, one for each object in a final input frame of the sequence, wherein the set of object codes represents a respective position of each object in the final input frame of the sequence. The method may further comprise generating from the sequence of state codes a predicted state code for a next unobserved frame. The method may further comprise converting the predicted state code to a state. The method may still further comprise performing any of the previously described operations.

There is further described a method for training a visual interaction network (model) system, comprising training the system to predict a sequence of unseen image frames from a sequence of input image frames using a training loss that is a weighted sum of a respective error term for each of the predetermined number of unseen frames. The system may be a VIN system as previously described.

The subject matter described in this specification can be implemented in particular embodiments so as to realize one or more of the following advantages.

A visual interaction network (VIN) system of the type described is able to learn to make object level prediction about future state configurations of physical systems using sensory observations, for example using exclusively visual input. In general data input to the system representing motion of objects of the physical system may be derived in any manner, for example from sensed position or velocity data, and/or from other data, but an advantage of the described system is that it can make predictions of object states, for example positions and velocities, exclusively from images.

The described VIN system is able to handle radically different styles of object-object interactions such as gravity interactions and rigid body interactions. Such a system is able to learn physics from videos and can model both short- and long-term spatial interactions between objects, allowing the system to accommodate both fast and slow movements. In such a system, error signals correcting object-level predictions of physical systems state configurations are sufficient to learn a perceptual front-end that supports objects and produces representations of scenes that are suitable for reasoning about objects and relations. Thus examples of the system are able to infer the physical states of multiple objects from sequences of image frames and can make accurate predictions of their future trajectories. Examples of the system perform well on a variety of physical systems and are robust to visual complexity and partial observability of the objects.

The visual input to the VIN system may be derived from a real or simulated physical system. The visual input may comprise image frames representing observations of the physical system, for example from a camera or stored video, or from a radar sensor, for example a LIDAR sensor.

A VIN system as described above may be used to provide action control signals for controlling the physical system dependent upon the predicted state of the physical system. For example the VIN system predictions may be used by a control algorithm to control the physical system, for example to maximize a reward predicted based on a predicted state of the physical system. The VIN system may be included in a reinforcement learning system, for example to estimate a future discounted reward from the predicted state of the physical system. The reinforcement learning system may have an action selection policy neural network for selecting actions to be performed by the physical system. The actions may be selected by sampling from a policy distribution or may be provided deterministically by the action selection policy neural network. The policy may be determined according to a policy gradient aiming to maximize an action value. The VIN system may be used to estimate the action value, for example by predicting a future state of the physical system in response to the action.

The physical system may be any real and/or simulated physical system. For example the physical system may comprise part of the environment of a real or simulated robot, or of a real or simulated autonomous or semi-autonomous vehicle, or part of the environment of any device. The physical system may also comprise a physical system with moving parts, in which case the VIN system may be employed to predict a future configuration and/or velocities of the moving parts. In some other applications the VIN system may be used as a physics engine in a simulation system or game or in an autonomous or guided reasoning or decision-making system.

Each network and the combination can be implemented as computer programs on one or more computers in one or more locations.

BRIEF DESCRIPTION OF THE DRAWINGS

Like reference numbers and designations in the various drawings indicate like elements.

DETAILED DESCRIPTION

Figure 1:
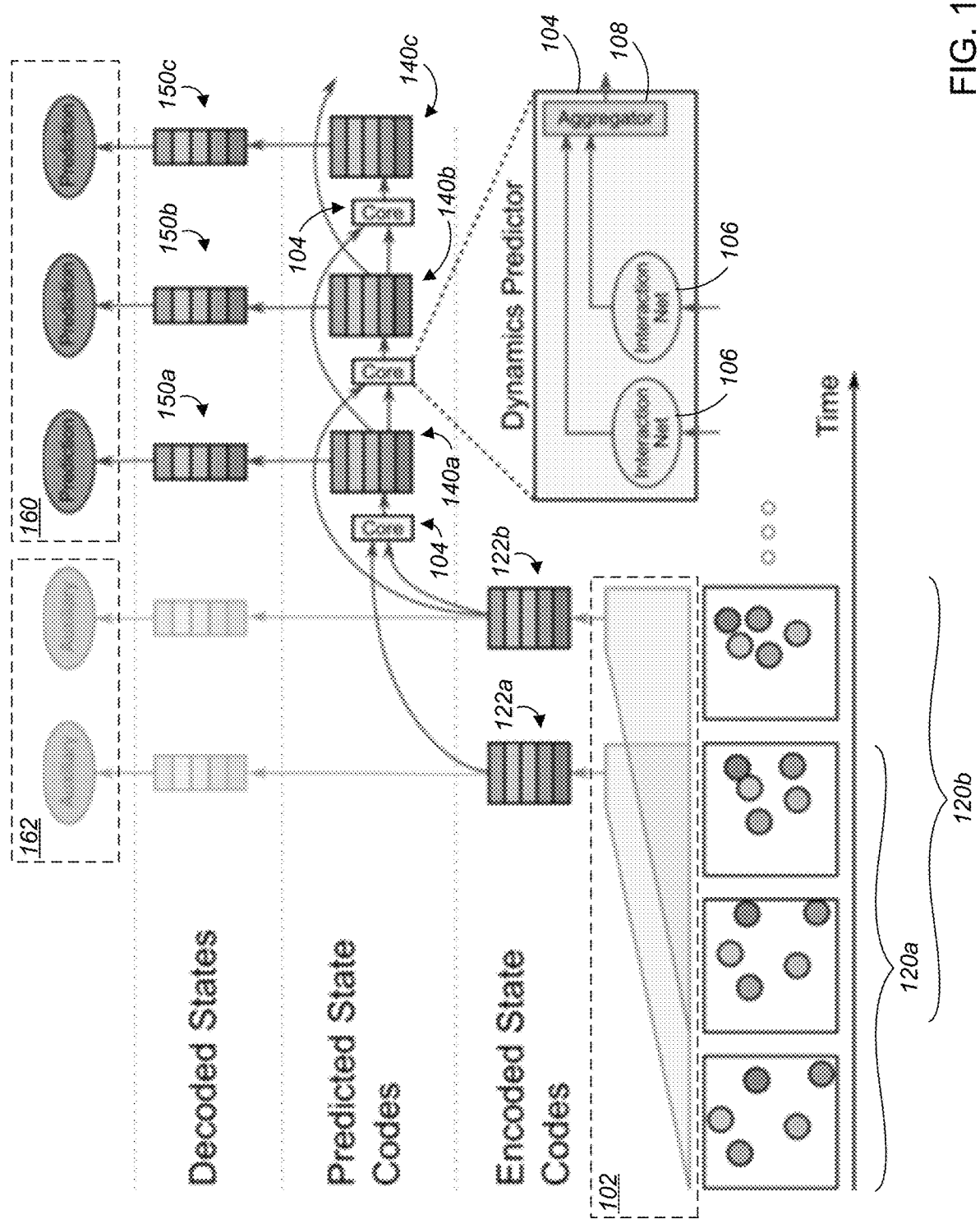
FIG. 1 illustrates an example visual interaction network system.

FIG. 1 illustrates an example visual interaction network system. The system can be trained as will be described to predict future physical states from supervised data sequences that consist of input image frames and target object state values. The system can be trained to approximate a range of different physical systems that involve interacting entities by implicitly internalizing the rules necessary for simulating their dynamics and interactions. The system can learn a model that infers object states and can make accurate predictions about these states in future time steps. The system predicts dynamics accurately. It is scalable, can accommodate forces with a variety of strengths and distance ranges, and can infer visually unobservable quantities, i.e., invisible object location, from dynamics. The system can also generate long rollout sequences that are both visually plausible and similar to ground-truth physics.

The system includes a visual encoder 102 based on convolutional neural networks (CNNs), and a dynamics predictor or "core" 104 which uses interaction networks 106 as described later for making iterated physical predictions. The system also includes a state decoder (not explicitly shown in FIG. 1).

Visual Encoder

The visual encoder 102 takes a sequence, in the example a triplet of consecutive frames 120a, 102b as input and outputs for each triplet a state code 122a, 122b. Each frame shows objects. A state is a list of each object's position and velocity vector. A state code is a list of vectors, one for each object in the scene. Each of these vectors is a distributed representation of the position and velocity of its corresponding object. As referred to later, a slot is an entry, i.e. vector, in the list corresponding to an object. The number of slots may be a hyperparameter of the system. The visual encoder is applied in a sliding window over a sequence of frames, producing a sequence of state codes. The training targets for the system are ground truth states.

Frame Pair Encoder of Visual Encoder

Figure 2:
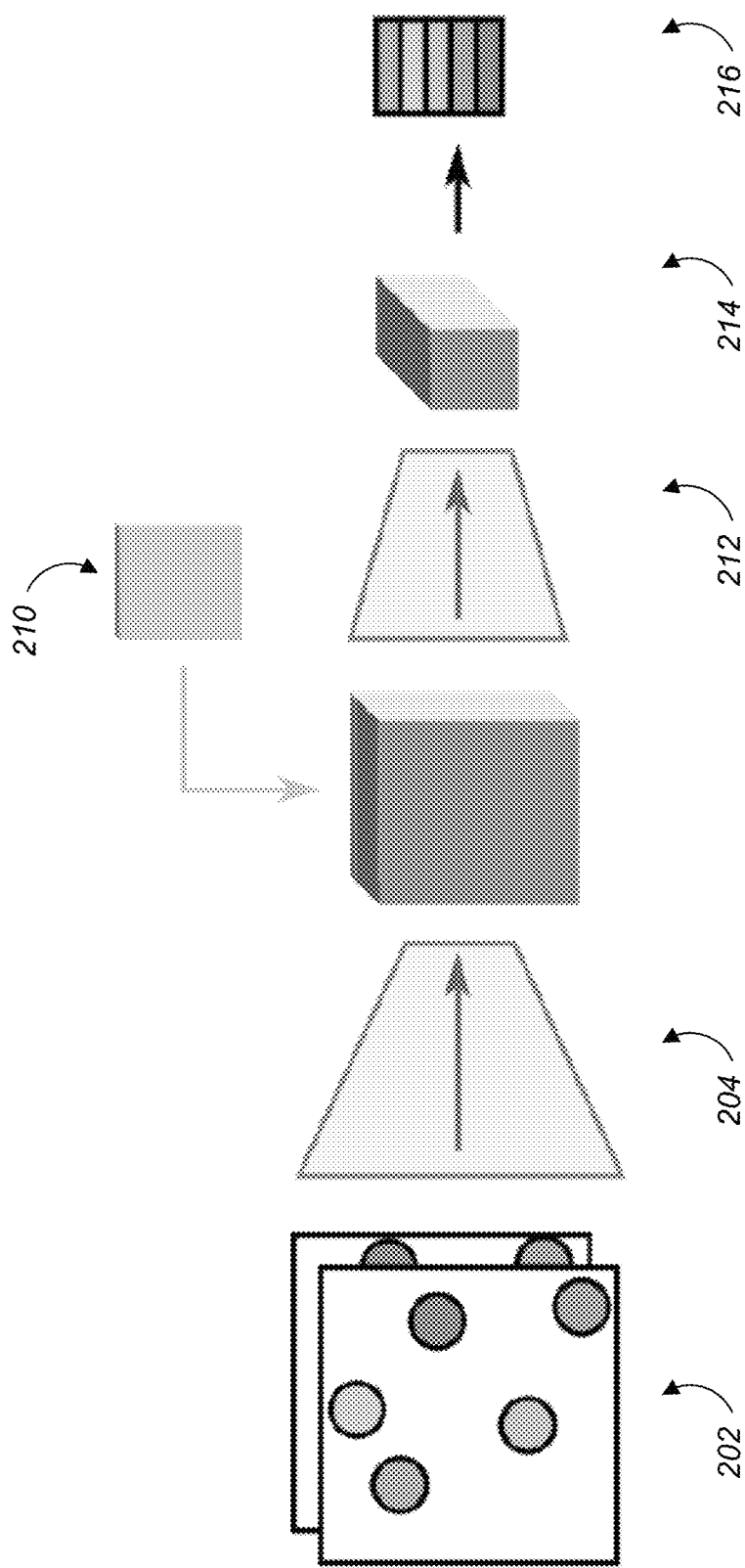
FIG. 2 illustrates an example frame pair encoder of a visual encoder.

FIG. 2 illustrates a frame pair encoder of the visual encoder. The frame pair encoder is a CNN that produces a state code from pair of images and used to encode a sequence of, for example, three images. Thus the frame pair encoder takes a pair of consecutive frames 202 and outputs a frame-pair state code 216. The frame pair encoder is applied to both consecutive pairs of frames in a sequence of three frames. The two resulting frame-pair state codes are aggregated, for example by a slot-wise MLP (not shown), into an encoded state code for the sequence of three images. Here aggregating slot-wise means that the MLP takes inputs from a pair of slots at a time to produce an aggregated output for a corresponding slot. The frame pair encoder applies a CNN 204 with two different kernel sizes to a channel-stacked pair of frames, appends constant x, y coordinate-defining channels 210 as described later, and applies a CNN, for example with alternating convolutional and max-pooling layers 212 until achieving unit width and height 214. The resulting tensor of shape $1 \times 1 \times (N_{object} \times L'_{code})$ is reshaped into frame-pair state code 216 of shape $N_{object} \times L'_{code}$, where $N_{object}$ is the number of objects in the scene and $L'_{code}$ is the length of each state code slot before aggregation. The two state codes are fed into the aggregator to produce the final encoder output, e.g. output 122a (FIG. 1), from the triplet, that is a state code for the sequence of image frames. The state code for the sequence of image frames has a slot length $L_{code}$ which may, but need not be different to $L'_{code}$.

One important feature of the visual encoder architecture is its weight sharing given by applying the same frame pair encoder on both pairs of frames, which approximates a temporal convolution over the input sequence. Similarly in other implementations a 3D CNN, that is a CNN with two spatial dimensions and one temporal dimension, may take the sequence of frames as input and provide the state code for the sequence code as an output.

Another important feature is the inclusion of the constant x, y coordinate defining channels. These may be combined with the data from the input frames at any convenient level in the CNN and may define a mesh over the image frames, for example a rectangular or other grid, which is constant from one image frame to another. Thus in some implementations the constant x, y coordinate defining channels define an x- and y-coordinate meshgrid over the image. This allows positions to be incorporated throughout much of the processing. Without the coordinate channels, such a convolutional architecture would have to infer position from the boundaries of the image, a more challenging task.

The following paragraphs will describe the particular parameters and details of one implementation of a visual encoder. In this implementation, the visual encoder takes a sequence of three images as input and outputs a state code. Its sequence of operations on frames [F1, F2, F3] is as follows:

Apply a frame pair encoder to [F1, F2] and [F2, F3], obtaining S1 and S2. These are length-32 vectors which are output from the image pair encoder.

Apply a shared linear layer to convert S1 and S2 to tensors of shape $N_{object} \times 64$. Here $N_{object}$ is the number of objects in the scene, and 64 is the length of each state code slot.

Concatenate S1 and S2 in a slot-wise manner, obtaining a single tensor S of shape $N_{object} \times 128$.

Apply a shared MLP with one hidden layer of size 64 and a length-64 output layer to each slot of S. The result is the encoded state code for the sequence of frames [F1, F2, F3].

The image pair encoder of this implementation takes two images as input and outputs a candidate state code. Its sequence of operations on frames [F1, F2] is as follows:

Stack F1 and F2 along their color-channel dimension.

Independently apply two 2-layer convolutional nets, one with kernel size 10 and 4 channels and the other with kernel size 3 and 16 channels. Both are padded to preserve the input size. Stack the outputs of these convolutions along the channel dimension.

Apply a 2-layer size-preserving convolutional net with 16 channels and kernel-size 3. Preserving the input size facilitates adding the coordinate mesh.

Add two constant coordinate channels, representing the x- and y-coordinates of the feature matrix. These two channels define a meshgrid with min value 0 and max value 1.

Convolve to unit height and width with alternating convolutional and 2×2 max-pooling layers. The convolutional layers are size-preserving and have kernel size 3. In total, there are 5 each of convolutional and max-pooling layers. The first three layers have 16 channels, and the last two have 32 channels. Flatten the result into a 32-length vector. This is the image pair encoder's output.

Dynamics Predictor

The example dynamics predictor 104 shown in FIG. 1 takes a sequence of state codes 122a, 122b output from the visual encoder 102 applied in the sliding-window manner to a sequence of frames. Thus the dynamics predictor takes as input a sequence of state codes where each state code is derived from a respective sequence of frames. The dynamics predictor outputs a predicted state code 140a for a subsequent frame of the sequence. FIG. 1 illustrates the processing involved in a rollout where state codes 140b,c for two further image frames are predicted. Thus predicted state code 140b is predicted from the state codes 122b and 140a, and predicted state code 140c is predicted from state codes 140a and 140b.

The dynamics predictor 104 comprises a set of interaction networks, each taking an input at a different temporal offset and producing a corresponding candidate state code. In the example shown in FIG. 1, for simplicity of illustration the dynamics predictor 104 has two interaction networks; in the example described later there are three. The candidate state codes are aggregated by an aggregator 108, in implementations a multilayer perceptron (MLP), to produce a predicted state code for the next frame. The state decoder, described below, converts the predicted state codes 140a, 140b, and 140c, to predicted states 150a, 150b, and 150c, respectively.

The dynamics predictor 104 implements a variant of an interaction network, that is a state-to-state physical predictor model. Interaction networks are described in Peter Battaglia, et al., Interaction Networks for Learning about Objects, Relations and Physics, *Advances in Neural Information Processing Systems*, pages 4502-4510, 2016. An interaction network operates on a set of vectors (i.e. matrix) representing object characteristics with an object relation neural network in order to generate an updated set of vectors (i.e. an updated matrix) representing the interactions between the objects. For example the object relation neural network may take as input the vectors for objects i and j and output a modified vector for object i; the interaction network may, for each object, sum the modified vectors for the interactions between object i and each of the other objects j to provide an updated vector for object i; a self-interaction (object i to object i) term may also be included determined by a different, self-interaction neural network.

The interaction networks implemented by the dynamics predictor, however, aggregate over multiple different temporal offsets. The dynamics predictor has a set of temporal offsets, e.g., a set of three offsets $\{1, 2, 4\}$, with one interaction network 106 (FIG. 1) for each. Given an input state code sequence 122a,b (FIG. 1 only shows a single time offset for simplicity of representation), for each offset t a separate interaction network 106 computes a candidate predicted state code from the input state code at index t. The aggregator 108, which in implementations comprises an MLP operating slot-wise on the candidate predicted state codes, transforms the list of candidate predicted state codes into a predicted state code for a frame. Since the candidate predicted state codes all relate to the same predicted state/frame the time offsets are backwards from the predicted state/frame.

The temporal offset aggregation of this architecture enhances its power by allowing it to accommodate both fast and slow movements by different objects within a sequence of frames. This "factorized" representation using interaction networks facilitates efficient learning of interactions even in scenes with many objects and is an important contributor to the performance of the architecture.

Figure 3:
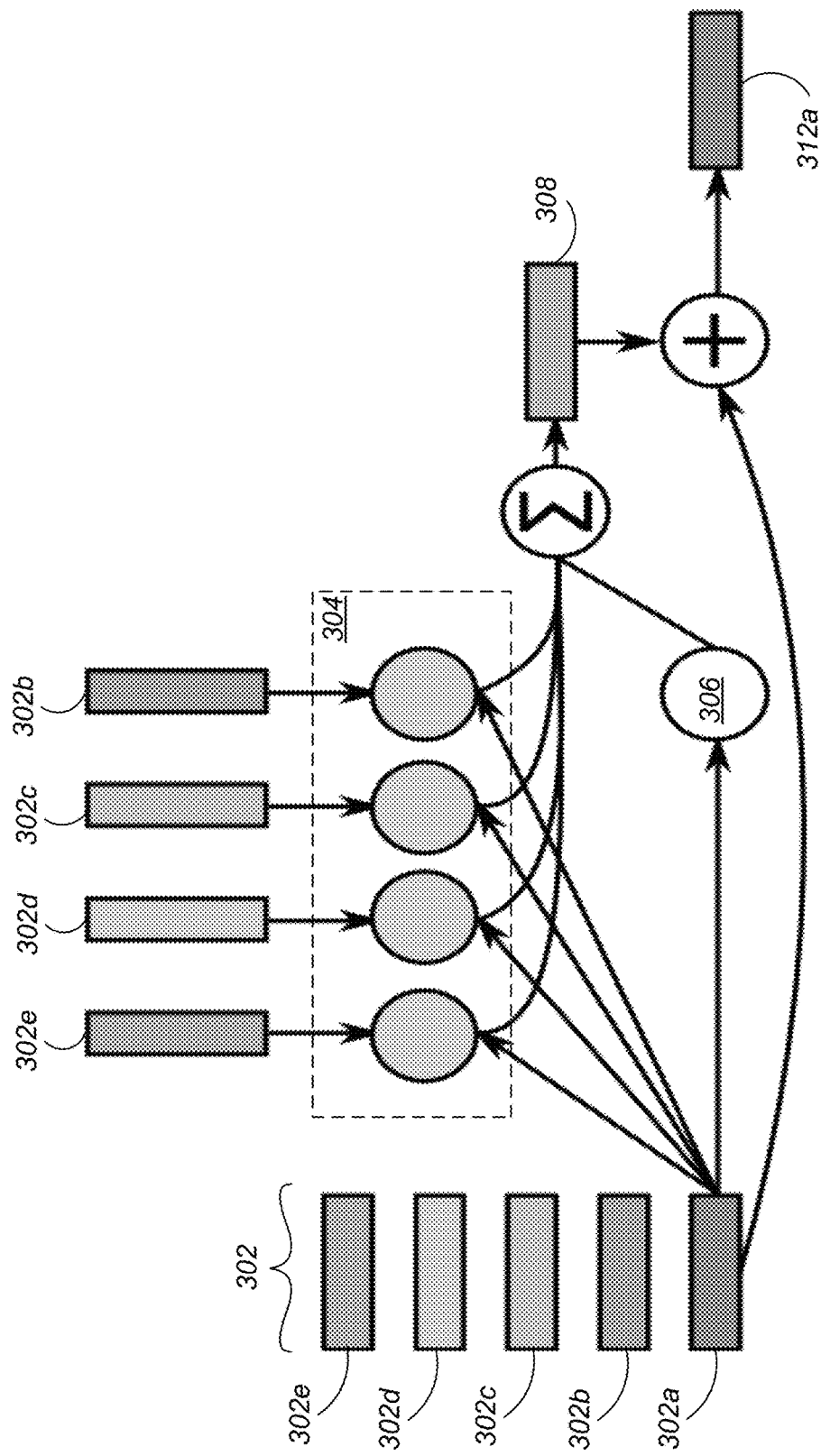
FIG. 3 illustrates the operation of example interaction networks in a dynamics predictor.

FIG. 3 schematically illustrates the operation of an interaction network 106 in the dynamics predictor. The interaction network for each temporal offset in the dynamics predictor operates as follows. For each slot of a state code 302, e.g. slot 302a as illustrated, a relation neural network 304 is applied to the concatenation of the slot 302a with each other slot 302b, 302c, 302d, 302e. Each slot corresponds to a respective object (the repetition of slots 203b-e in FIG. 2 is merely for convenience of illustration). A self-dynamics neural network 306 is applied to the slot 302a itself. The outputs of neural networks 304 and 306 are summed and, in implementations, post-processed by the affector 308, which in implementations is a neural network such as an MLP. The function of the affector 308 is facilitate learning predictions of how the interactions and dynamics of the observed system influence the objects. The output of the affector 308 is applied to the slot 302a, for example by adding the output of the affector to the contents of the slot, to produce a vector for the corresponding slot 312a of a candidate predicted state code.

The following paragraphs will describe the particular parameters and details of one implementation of a dynamics predictor. In this example implementation the dynamic predictor has three interaction networks, each with a different time offset. The example implementation takes a sequence of 4 consecutive state codes [S1, . . . S4] and outputs a predicted state code as follows:

Temporal offsets are 1, 2, 4, so the dynamics predictor has three interaction networks $C_1, C_2, C_4$. Since the temporal offset indexing goes back in time (the prediction for a frame is based upon earlier frames at different temporal offsets from the frame), $C_4$ is applied to $S_1$, $C_2$ is applied to $S_3$, and $C_1$ is applied to $S_4$. Let $S_1^{candidate}$, $S_3^{candidate}$, $S_4^{candidate}$ denote the outputs.

Apply a shared slot-wise MLP aggregator with sizes [32, 64] to the concatenation of $S_i^{1,3,4}$ for each $i \in \{1, \ldots, N_{object}\}$. The resulting state code is the predicted state code output of the dynamics predictor.

Each interaction network of this implementation takes a state code $[M_i]_{1 \leq i \leq N_{object}}$ as input and outputs a candidate state code as follows:

Apply a self-dynamics MLP with sizes [64, 64] to each slot $M_i$. Let $[M_i^{self}]_{1 \leq i \leq N_{object}}$ as denote these.

Apply a relation MLP with sizes [64, 64, 64] to the concatenation of each pair of distinct slots. Let $[M_{ij}^{rel}]_{1 \leq i \neq j \leq N_{object}}$ denote the outputs.

Sum for each slot the quantities computed so far, to produce an updated slot. Specifically, let $M_i^{update} = M_i^{self} + \Sigma_j M_{ij}^{rel}$.

Apply an affector MLP with sizes [64, 64, 64] to each $M_i^{update}$, yielding $M_i^{affect}$.

For each slot, apply a (the same) shared MLP with sizes [32, 64] to the concatenation of Mi and $M_i^{affect}$. The resulting state code is the candidate state code output of the interaction network.

State Decoder

The system also includes a state decoder that converts a predicted state code, e.g. predicted state code 140a, 140b, and 140c, to a predicted decoded state, e.g. predicted decoded state 150a, 150b, and 150c, respectively. The state decoder is not explicitly shown in FIG. 1 for clarity of illustration but operates between the predicted state codes and decoded states. The state decoder may comprise a linear layer with input size $L_{code}$ and output size four for a position and velocity vector. This linear layer is applied independently to each slot of the predicted state code.

Training

When training the state decoder may be applied to encoded state codes to generate decoded states for use in auxiliary encoder loss functions 162, and may be applied to predicted state codes to generate predicted states for use in a prediction loss function 160. The training loss may comprise a sum of this prediction loss and the auxiliary encoder loss. More specifically, the auxiliary loss may be derived from a difference between a state decoded from a state code and ground truth state, namely the input to the visual encoder from which the visual encoder generated the state code. The prediction loss may be derived from comparison with frames of a ground truth training sequence. In some implementations a prediction loss function may be derived from a rollout from a sequence of frames in which future frames are weighted less in the loss by a temporal discount factor.

The system lends itself well to long-term predictions because the dynamics predictor can be treated as a recurrent network, in the sense that one predicted state code can be used as an input to predict another, and rolled out on state codes. Noise in the visual encoder output appears beneficial for training. In one case, the system was trained to predict a sequence of eight unseen future states. The prediction loss was a normalized weighted sum of the corresponding eight error terms. The sum was weighted by a discount factor that started at 0.0 and approached 1.0 throughout training, so at the start of training the system must only predict the first unseen state and at the end it must predict an average of all eight future states.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system implemented by one or more computers, the system comprising:
    one or more computers and one or more storage devices on which are stored instructions that are operable, when executed by the one or more computers, to cause the one or more computers to perform operations comprising:
    receiving data representing a sequence of image frames depicting one or more objects in a scene;
    generating, from the sequence of image frames, a sequence of state codes that each comprise one or more respective object codes that each corresponds to a respective object of the one or more objects and represents a position and velocity of the respective object in the scene;
    generating from the sequence of state codes, a predicted state code for a next unobserved image frame, wherein the predicted state code comprises a respective object code for each object predicted to be in the next unobserved image frame; and
    converting the predicted state code to a state comprising a respective position and velocity vector for each object predicted to be in the next unobserved image frame.

2. The system of claim 1, wherein
the state and each state code of the sequence of state codes comprise a respective list of position and velocity vectors.

3. The system of claim 1, wherein
generating the sequence of state codes comprises:
    applying a sliding window over the sequence of image frames, wherein the sliding window includes two or more respective consecutive image frames in the sequence of image frames as the sliding window is applied from an initial image frame to a terminal image frame of the sequence of image frames; and
    generating a respective state code for each of the two or more respective consecutive image frames in the sequence of image frames.

4. The system of claim 1,
wherein each image frame of the sequence of image frames occurs at a respective temporal offset relative to the next unobserved image frame,
wherein receiving data representing the sequence of image frames comprises receiving an indication of a plurality of different temporal offsets; and
wherein generating the predicted state code for the next unobserved image frame comprises:
generating, for each image frame at a temporal offset indicated in the plurality of different temporal offsets, a respective candidate state code, and
aggregating the candidate state codes using a multilayer perceptron configured to receive the candidate state codes as input and to produce the predicted state code for the next unobserved image frame as output.

5. The system of claim 4, wherein
the temporal offsets of the plurality of temporal offsets are 1, 2, and 4.

6. The system of claim 4, wherein generating, for each image frame at a temporal offset indicated in the plurality of different temporal offsets, a respective candidate state code comprises:
processing each image frame at a respective one of the plurality of different temporal offsets through a respective interaction network of a plurality of interaction networks to obtain a candidate state code corresponding to the image frame, wherein each interaction network is configured to take an input image frame of a sequence of image frames at a different temporal offset and to produce a respective candidate state code for the next unobserved image frame.

7. The system of claim 1, wherein the operations further comprise:
generating, for each of a plurality of next unobserved image frames, a respective predicted state code comprising a respective object code for each object predicted to be in the next unobserved image frame.

8. A method comprising:
receiving data representing a sequence of image frames depicting one or more objects in a scene;
generating, from the sequence of image frames, a sequence of corresponding state codes that each comprise one or more respective object codes that each corresponds to a respective object of the one or more objects and represents a position and velocity of the respective object in the scene;
generating, from the sequence of state codes, a predicted state code for a next unobserved image frame, wherein the predicted state code comprises a respective object code for each object predicted to be in the next unobserved image frame; and
converting the predicted state code to a state comprising a respective position and velocity vector for each object predicted to be in the next unobserved image frame.

9. The method of claim 8, wherein:
generating the sequence of state codes comprises:
applying a sliding window over the sequence of image frames, wherein the sliding window includes two or more respective consecutive image frames in the sequence of image frames as the sliding window is applied from an initial image frame to a terminal image frame of the sequence of image frames; and
generating a respective state code for each two or more respective consecutive image frames in the sequence of image frames.

10. The method of claim 8,
wherein each image frame of the sequence of image frames occurs at a respective temporal offset relative to the next unobserved image frame,
wherein receiving data representing the sequence of image frames comprises receiving an indication of a plurality of different temporal offsets; and
wherein generating the predicted state code for the next unobserved image frame comprises:
generating, for each image frame at a temporal offset indicated in the plurality of different temporal offsets, a respective candidate state code, and
aggregating the candidate state codes using a multilayer perceptron configured to receive the candidate state codes as input and to produce the predicted state code for the next unobserved image frame as output.

11. The method of claim 10, wherein generating, for each image frame at a temporal offset indicated in the plurality of different temporal offsets, a respective candidate state code comprises:
processing each image frame at a respective one of the plurality of different temporal offsets through a respective interaction network of a plurality of interaction networks to obtain a candidate state code corresponding to the image frame, wherein each interaction network is configured to take an input image frame of a sequence of image frames at a different temporal offset and to produce a respective candidate state code for the input image frame.

12. The method of claim 8, further comprising:
generating, for each of a predetermined number of next unobserved image frames, a respective predicted state code comprising a respective object code for each object predicted to be in the next unobserved image frame of the predetermined number of next unobserved image frames.

13. A non-transitory computer storage medium encoded with instructions that, when executed by one or more computers, cause the one or more computers to perform operations comprising:
receiving data representing a sequence of image frames depicting one or more objects in a scene;
generating, from the sequence of image frames, a sequence of corresponding state codes that each comprise one or more respective object codes that each corresponds to a respective object of the one or more objects and represents a position and velocity of the respective object in the scene;
generating, from the sequence of state codes, a predicted state code for a next unobserved image frame, wherein the predicted state code comprises a respective object code for each object predicted to be in the next unobserved image frame; and
converting the predicted state code to a state comprising a respective position and velocity vector for each object predicted to be in the next unobserved image frame.

14. The computer-readable media of claim 13, wherein generating the sequence of state codes comprises:
applying a sliding window over the sequence of image frames, wherein the sliding window includes two or more respective consecutive image frames in the sequence of image frames as the sliding window is applied from an initial image frame to a terminal image frame of the sequence of image frames; and
generating a respective state code for each two or more respective consecutive image frames in the sequence of image frames.

15. The computer-readable media of claim 13,
wherein each image frame of the sequence of image frames occurs at a respective temporal offset relative to the next unobserved image frame,
wherein receiving data representing the sequence of image frames comprises receiving an indication of a plurality of different temporal offsets; and
wherein generating the predicted state code for the next unobserved image frame comprises:
generating, for each image frame at a temporal offset indicated in the plurality of different temporal offsets, a respective candidate state code, and
aggregating the candidate state codes using a multilayer perceptron configured to receive the candidate state codes as input and to produce the predicted state code for the next unobserved image frame as output.

16. A method for training a visual interaction network system, comprising:
training the system to predict a respective state code for each of a sequence of unobserved image frames and from an input sequence of input image frames, wherein each state code comprises one or more respective object codes that corresponds to a respective object of one or more objects depicted in a scene by the sequence of input image frames and that represents a predicted position and velocity of the respective object for the unobserved image frame,
wherein the training comprises using a training loss that is a weighted sum of a respective error term for each predicted state code corresponding to an unobserved image frame.

17. The method of claim 16, wherein the system comprises:
a visual encoder component configured to:
receive as input, data representing the sequence of input image frames depicting the one or more objects in the scene and to output a sequence of corresponding state codes that each comprise one or more respective object codes that each corresponds to a respective object of the one or more objects and represents a position and velocity of the respective object in the scene depicted in two or more consecutive image frames in the sequence of input image frames;
a dynamic predictor component configured to:
take as input the sequence of corresponding state codes and predict a final state code for a next unobserved image frame; and
a state decoder component configured to:
convert a state code to a state, wherein the state represents a position and velocity vector for each object in the scene.

18. The method of claim 17, wherein:
the dynamic predictor component comprises several interaction network components, each being configured to take input image frames of the sequence of input image frames each at a different one of a plurality of different temporal offsets relative to a next unobserved image frame, and to produce a respective candidate state code for each image frame at the different one of the plurality of different temporal offsets; and
the dynamic predictor component is configured to aggregate the candidate state codes by a multilayer perceptron to produce a predicted state code for the next unobserved image frame after the input sequence of image frames.

19. The method of claim 17, wherein,
the system is configured to:
apply the visual encoder in a sliding window over the sequence of input image frames, wherein the sliding window includes two or more respective consecutive input image frames in the sequence of input image frames as the sliding window is applied from an initial image frame to a terminal image frame of the sequence of image frames; and
generate a respective state code from each two or more respective consecutive input image frames in the sequence of input image frames.

20. The method of claim 17, wherein:
the dynamic predictor component is configured as a recurrent neural network.

* * * * *